E. C. CORDES.
JOINT ANCHOR.
APPLICATION FILED JAN. 12, 1915.
1,165,155.
Patented Dec. 21, 1915.
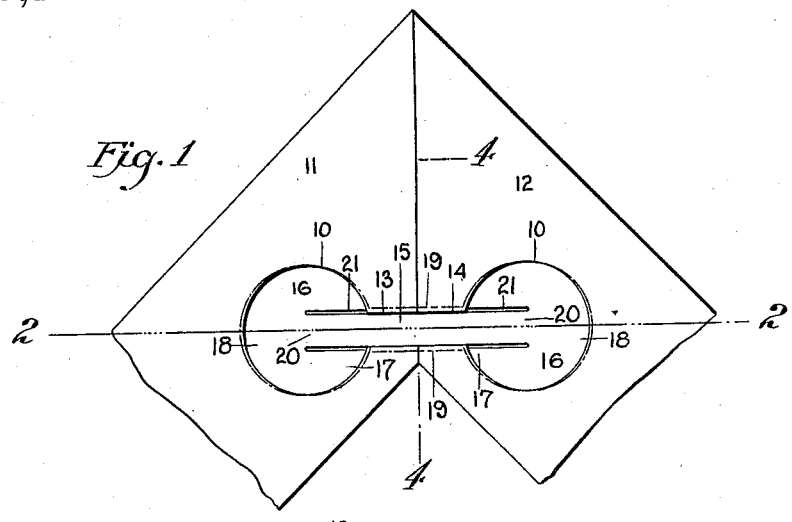
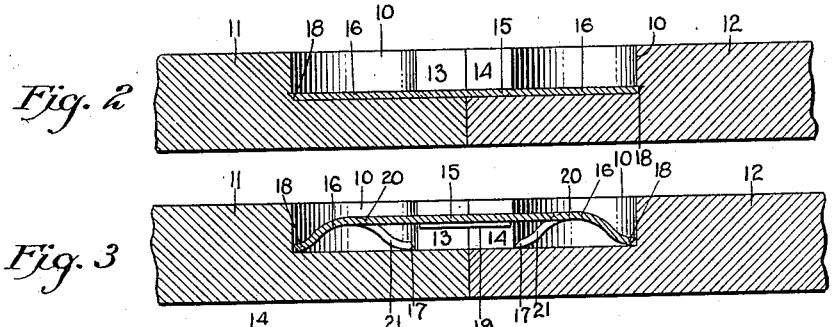
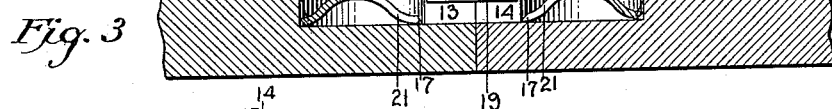
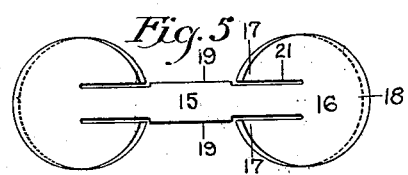
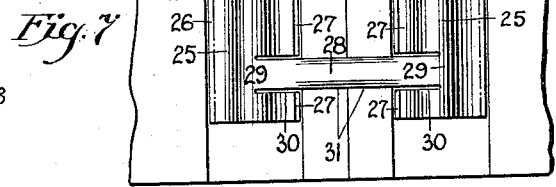
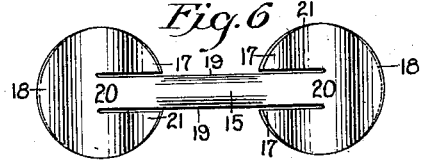
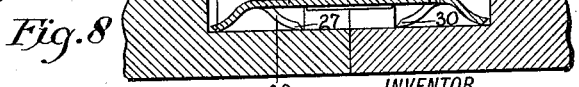
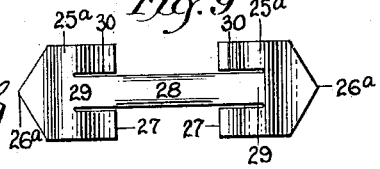
WITNESSES:
INVENTOR
Edward C. Cordes
ATTORNEYS

UNITED STATES PATENT OFFICE.

EDWARD C. CORDES, OF CINCINNATI, OHIO.

JOINT-ANCHOR.

1,165,155. Specification of Letters Patent. Patented Dec. 21, 1915.

Application filed January 12, 1915. Serial No. 1,859.

*To all whom it may concern:*

Be it known that I, EDWARD C. CORDES, a citizen of the United States, and a resident of Cincinnati, in the county of Hamilton and State of Ohio, have invented a new and Improved Joint-Anchor, of which the following is a full, clear, and exact description.

My invention has for its object to provide a joint anchor constructed with a shank which connects the central portions of two plates so that the edges of the plates may be bent down and be inserted in openings in members to be joined. When this has been done the plates may be pressed flat to move the central portions of the plates away from each other and to embed the edges of the plates in the members at the openings. This will secure the plates to the members and draw the members together by means of the shank.

Another object of the invention is to arch the shank transversely and insert the shank in grooves connecting the openings so that the shank may be flattened in the grooves with the result that the sides of the shank will be embedded in the members at the sides of the grooves. By this means the shank as well as the plates will be secured relatively to the members.

Additional objects of the invention will appear in the following specification in which the preferred form of my invention is disclosed.

In the drawings similar reference characters refer to similar parts in all the views in which—

Figure 1 is a view showing a joint which is locked by my joint anchor; Fig. 2 is a sectional view on the line 2—2 of Fig. 1; Fig. 3 is a sectional view similar to that shown in Fig. 2 but illustrating the position of the plates and the shank relatively to the members before the plates and the shank are flattened against the bottom of the openings and grooves in the members; Fig. 4 is a sectional view on the line 4—4 of Fig. 1; Fig. 5 is a view showing how one of the anchor joints may be cut from a single piece of metal; Fig. 6 is a view similar to that shown in Fig. 5 but with the shank arched transversely and with the edges of the plates bent down so that the shank and the plates will be disposed as shown in Fig. 3 of the drawings; Fig. 7 is a view showing a modified form of the invention; Fig. 8 is a transverse sectional view of Fig. 7; and Fig. 9 is a view showing the construction of one of the anchor joints similar to those illustrated in Figs. 7 and 8.

By referring to the drawings it will be seen that in the mitered joint illustrated in Figs. 1, 2 and 3, with which my anchor is used, openings or sockets 10 are made in the members 11 and 12 which are to be joined together, these openings 10 being connected by grooves 13 and 14. When the openings and the grooves have been made in the members 11 and 12 as illustrated in Fig. 1 of the drawings, my anchor which is constructed with a shank 15 arched transversely, and the plates 16 with which the shank is integral, is disposed with the plates 16 in the openings 10 and with the edges 17 and 18 of the plates 16 bent downwardly as illustrated in Fig. 3 of the drawings. When the plates 16 are disposed in the openings 10 in the manner set forth the shank 15 will be disposed in the grooves 13 and 14. To anchor the joint it is then only necessary to press the plates 16 and the shank 15 flat when the edges 17 and 18 of the plates 16 will be embedded in the members 11 and 12 at the bottom of the openings 10 and the sides 19 of the shank 15 will be embedded in the members 11 and 12 at the sides of the grooves 13 and 14.

The shank 15 which is integral with the plates 16 is connected with the said plates 16 at 20 where the inner ends of the slots 21 terminate. It will, therefore, be seen that when the plates 16 and the shank 15 are flattened in the manner set forth, the shank 15 will be driven down in the slots 21 and the shank 15 and the plates 16 will be disposed substantially in the same plane, thereby forcing the edges 17 of the plates 16 into the members 11 and 12 at the openings 10 and adjacent the grooves 14, the edges 18 of the plates 16 being also forced into the members 11 and 12 at the openings 10. As the members 10 and 11 resist to some extent, the plates 16 at their edges 17 push the members 11 and 12 in the direction of each other and hold them locked in position.

Figs. 7 and 8 show the modified forms of the invention which are particularly well adapted to secure together members disposed side by side. In this modified form of the invention, the members 22 and 23 are constructed with longitudinally extending slots 24 in which plates 25 are disposed, these plates 25 having their edges 26 and 27 bent down in the same manner as the edges 17 and 18 of the disk shaped plates 16 are bent. The plates 25 are connected by one or more shanks 28 which are joined with the plates 25 at 29 which is substantially at the inner ends of the slots 30. The slots 30 are made in the plates 25 so that the plates 25 and the shank 28 may be constructed of a single piece of material and the shanks 28 may be disposed in the slots 30 when the plates 25 are bent flat against the bottom of the slots 24. The shanks 28 are disposed in the grooves 31 which connect the slots 24 and these shanks are preferably arched in cross section in the manner described so that the sides of the shanks 28 will be embedded in the members 22 and 23 at their grooves 31. In the construction shown in Fig. 9 of the drawings the plates $25^a$ are constructed with points $26^a$ instead of elongated edges 26. In other respects the construction illustrated in Fig. 9 corresponds with the construction illustrated in Figs. 7 and 8 with the exception that the construction illustrated in Fig. 9 only provides one shank while in the construction illustrated in Figs. 7 and 8 two shanks are provided. However, as has been stated, the number of shanks which are used to connect the plates, is wholly immaterial.

Having thus described my invention I claim as new and desire to secure by Letters Patent:

1. A joint anchor comprising two pliable plates connected by a shank and having portions extending along the side of the shank toward each other but free from the said side so that the said portions may be deflected either to or from the plane of the shank.

2. A joint anchor comprising two pliable plates connected by a shank and having portions extending in the general direction of each other at the side of the shank, the plates at the said portions and at portions extending outwardly from the shank being normally flexed from the plane of the shank for the purpose specified.

3. A joint anchor comprising two pliable plates, each plate being cut through an edge and a shank connecting the pliable plates at the inner ends of the cuts so that portions of the plates adjacent the shank may be deflected either to or from the plane of the shank.

4. A joint anchor comprising two pliable plates disposed edge to edge and connected at their central portions by a shank free from the said edges so that the pliable plates beyond their central portions and at their said edges may be deflected either toward or from the plane of the shank for the purpose specified.

5. A joint anchor comprising two pliable plates disposed edge to edge and connected at their central portions by a shank normally arched transversely and free from the said edges of the plates, the pliable plates beyond their central portions and at their said edges being normally flexed from the plane of the shank so that the plates and the shank may be flattened out for the purpose specified.

6. A joint anchor comprising two pliable plates disposed edge to edge and connected at their central portions by a shank free from the said edges of the plates, the plates beyond their central portions and at their said edges being normally flexed from the plane of the shank for the purpose specified.

7. In a joint, two members having sockets spaced from their adjacent edges and connecting grooves, and a fastener comprising two plates connected by a shank and having portions extending along the side of the shank but free therefrom, the said plates entering the walls of the sockets on the sides adjacent each other.

8. In a joint, two members having sockets spaced from their adjacent sides and a fastener comprising two plates having sides entering the members at the sockets on the said sides of the members, and a shank free from the said sides of the plates and integral with the central portions of the plates.

9. In a joint, two members having sockets spaced from their adjacent edges and connecting grooves and a fastener comprising two plates connected at their central portions by a shank, the plates entering the members at the sockets on the said sides of the members and the sides of the shank entering the members at the side of the grooves.

10. A joint anchor comprising two pliable plates disposed edge to edge and connected by a shank integral with the central portions of the plates and free from the said edges of the plates, the plates beyond their central portions and at their said edges being normally flexed from the plane of the shank for the purpose specified.

11. In a joint, two members having sockets spaced from their adjacent edges and connecting grooves, and a fastener comprising plates disposed one in each of the sockets, and a shank connecting the plates with its sides entering the members at the sides of the grooves.

In testimony whereof I have signed this specification in the presence of the two subscribing witnesses.

EDWARD C. CORDES.

Witnesses:
W. H. BALLENBERG,
WM. C. CRITCHELL.